United States Patent [19]

Yoshimoto et al.

[11] Patent Number: 4,831,975
[45] Date of Patent: May 23, 1989

[54] DRIVE MECHANISMS

[75] Inventors: Tokuji Yoshimoto, Wako; Takashi Inagaki, Kawagoe; Michio Ookubo, Kamifukuoka, all of Japan

[73] Assignee: Honda Giken Kogyo Kabushiki Kaisha, Tokyo, Japan

[21] Appl. No.: 106,246

[22] Filed: Oct. 8, 1987

[30] Foreign Application Priority Data

Oct. 8, 1986 [JP] Japan .................................. 61-155517
Mar. 26, 1987 [JP] Japan .................................. 62-72617

[51] Int. Cl.$^4$ .............................................. F01L 1/04
[52] U.S. Cl. ............................. 123/90.31; 123/90.27
[58] Field of Search ........................... 123/90.31, 90.27

[56] References Cited

U.S. PATENT DOCUMENTS

2,857,773 10/1958 Slonek ............................... 123/90.31
4,617,882 10/1986 Matsumoto ...................... 123/90.31

Primary Examiner—Andrew M. Dolinar
Attorney, Agent, or Firm—Lahive & Cockfield

[57] ABSTRACT

A cam shaft driving device for an engine which is adapted to operably associate a cam gear located on a cam shaft of an upper portion of an engine body with a driving gear on a crank shaft of a lower portion of the engine body, with this association being effected through the intermediary of a cam idling gear. In this device, first and second wall portions, mutually displaced along the axis of crank shaft rotation of the engine and projecting outwardly and laterally from both sides of the engine body, provide a receiving space. This receiving space is provided between adjacent cylinders in the engine body and is larger in laterally extending width than a diameter of the cylinders, with this width extending laterally of the cylinders and transversely of the axis of rotation of the crank shaft. A single gear holder is located in said receiving space, with this gear holder being mounted on at least one of the wall portions. The cam idling gear is rotatably supported and received on a side surface of the single gear holder. A shock absorbing, swingable boss/bearing arrangement may be provided for supporting the idling gear so as to control back lash phenomena.

3 Claims, 9 Drawing Sheets

DRIVE MECHANISMS

This invention pertains, in basic part, to a cam shaft driving device for an engine. In this respect, it is characterized by the following combination concept.

This basic concept involves a cam shaft driving device for an engine which is adapted to operably associate a cam gear located on a cam shaft of an upper portion of an engine body with a driving gear on a crank shaft of a lower portion of the engine body, with this association being effected through the intermediary of a cam idling gear.

This basic device comprises first and second wall portions mutually displaced along the axis of crankshaft rotation of the engine and projecting outwardly and laterally from both sides of the engine body to provide a receiving space.

The receiving space is provided between adjacent cylinders in said engine body and is larger in laterally extending width than a diameter of the cylinders, with the width extending laterally of the cylinders and transversely of the axis of rotation of the crank shaft. A single gear holder is located in the receiving space, with the gear holder being mounted on at least one of the wall portions.

The cam idling gear is rotatably supported and received on a side surface of the single gear holder.

An advantageous refinement of this basic concept resides in a unique, back-lash controlling, shock-absorbing, and swinging adjustment support for the cam idling gear entailing a combination as follows.

This particular refinement or combination provides supporting means for the cam idling gear which includes a holder operable to support said idling gear for swinging movement in a plane extending transversely of the axis of rotation of the driving gear meshing with said idling gear. This supporting means includes boss means defining, at least in part, the gear holder. The supporting means also includes a bearing rotatably supporting the idling gear on the boss means.

The boss means is supported for swinging movement between a swinging center axis and a swinging end of the supporting means, with this center axis extending longitudinally of the axis of rotation of this crank shaft. Adjusting and fixing means are operable to adjust a swinging angle of the boss means and secure the latter at a desired position.

A shock absorber housing space is provided between the boss means of the holder and the bearing. A shock absorber member is interposed in the shock absorbing housing space radially between the boss means and the bearing.

In describing this invention, by way of example but not limitation, reference will be made to presently preferred embodiments shown in the appended drawings.

DRAWINGS

In the drawings:

FIGS. 1 to 4 show one preferred embodiment of the present invention;

Having thus described the appended drawings, it may be useful, at this juncture, to take note of major apparatus elements which will be hereinafter referred to in the detailed description of these elements and their associated reference numerals, thus shown in FIGS. 1–4 are as follows:

1 Engine body
6 Cam shaft
7 Crank shaft
8 Cylinder
23,24 Wall portions
32 Receiving space
33 Cam driving gear
34 Cam gear
35 Cam idling gear
36 Gear holder The major elements and associated reference numerals of the FIGS. 6-14 embodiment are as follows:

109 Cam gear
110 Crank gear
111 Idler gear
115 Holder
116 Boss
121 O-ring(shock absorbing member)
122 Ball bearing
123 Space
131 Pin
133 Bolt With attention having been called to the major elements noted above, it is now appropriate to present a detailed discussion of the invention.

DETAILED DESCRIPTION OF BASIC INVENTION

The present invention relates to a cam shaft driving device, mainly for an engine of a vehicle.

Prior Art

Figure 5:
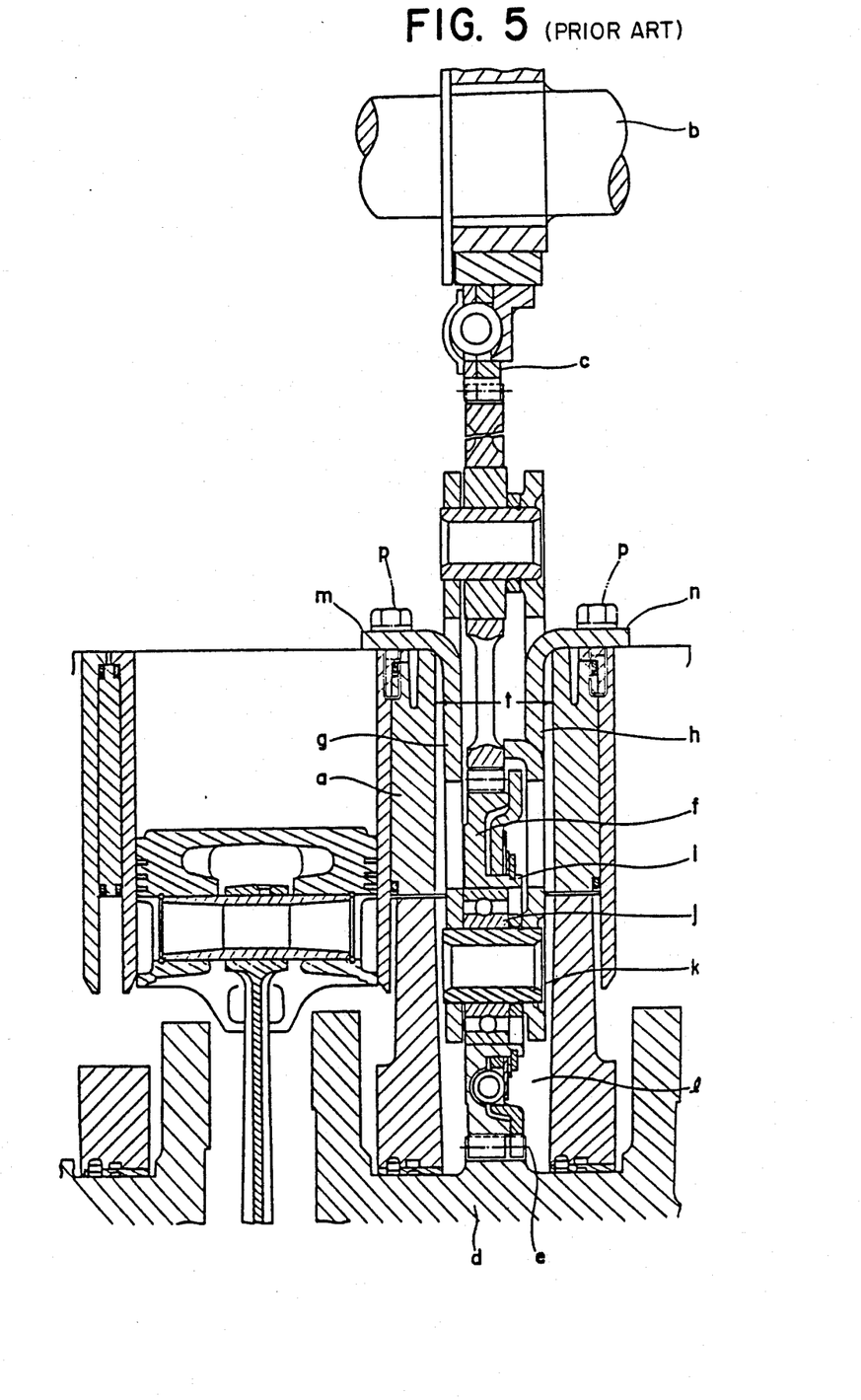
FIG. 5 is a longitudinal cross-sectional view showing a cam shaft driving device of a prior art engine.

In the prior art, for example, there exists Japanese patent application publication No. 59-166759 (No. 166759/1984) featuring a known cam shaft driving device. As seen in FIG. 5, this device is adapted to associate a gam gear "c" on a cam shaft "b" of an upper portion of an engine body with a cam driving gear "e" on a crank shaft "d" of a lower portion of the engine body through the intermediary of a cam idling gear "f", whereby said cam shaft "b" is adapted to be driven by the crank shaft "d".

However, in this prior art cam shaft driving device, a cam idling gear "f" is supported by two gear holders "g", "h" in a center supporting structure. That is, front and rear end portions of a bearing shaft "k", provided on a boss portion "i" of the cam idling gear "f" through the intermediary of a bearing "j", are accommodated in a receiving space "l". This space is provided between cylinders adjacent to each other. The idling gear "f" is supported by front and rear gear holders "g" and "h". Mounting seat portions "m" and "n" of upper ends of the gear holders "g" and "h" are adapted to be tightened by fixing belts "p" on upper surface portions of a cylinder block "a".

Thus, the cam idling gear "f" is constituted to be accommodated in the receiving space "l" in a condition supported in the center supporting structure between the two gear holders "g" and "h". Accordingly, in this arrangement, the thickness or gap "t" becomes large in the front and rear directions (a direction in which the cylinders are arranged) of the receiving space "l". Also, the whole engine becomes larger in the direction of the arrangement of the cylinders and further, it necessitates two gear holders whereby there has been a problem in that the number of parts increases.

Object of Basic Invention

In light of the above circumstances, it is an object of the present invention to provide a cam shaft driving device for an engine which is compact in the longitudinal direction of the cylinder arrangement of an engine, and to decrease the number of the parts, as well as to make it easier to assemble a cam idling gear and a gear holder.

Solution and Function of Basic Invention

In order to fulfill the above mentioned object, the present invention provides cam shaft and cam gear are located in an upper portion of an engine body and a driving gear is disposed on a crank shaft of a lower portion of the engine body. These gears are connected through the intermediary of a cam idling gear. Left and right wall portions (as viewed in FIG. 2) are projected outwardly from both sides of the engine body to constitute a receiving space. This space is provided between adjacent cylinders in the engine body and is larger laterally than a diameter of the cylinder, i.e. in a direction which extends transversely of the longitudinal axis of the engine. The cam idling ear is rotatably supported and received on one side surface of a single gear holder in the receiving space, the gear holder being mounted on at least one of the wall portions.

In the present embodiment, the cam idling gear is supported with a cantilever-like structure comprising a gear holder located in the receiving space formed between cylinders. This diminishes the thickness of the receiving space. In addition, the gear holder is mounted on the wall portions constituting the receiving space. Therefore, it is possible to easily assemble the cam idling gear and the gear holder.

One preferred embodiment of the present invention will now be described below with respect to FIGS. 1 to 4.

Figure 1:
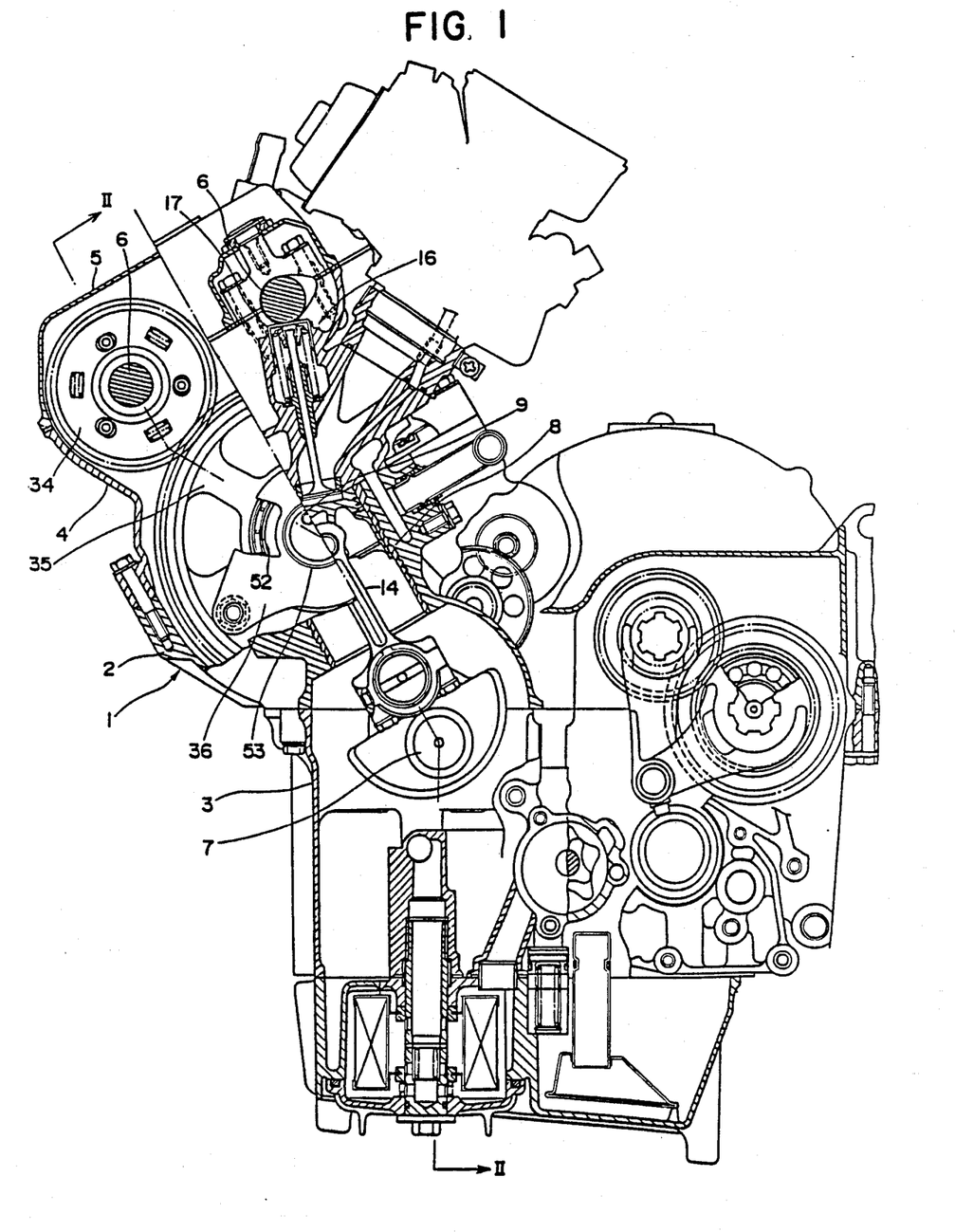
FIG. 1 is a cross-sectional view showing an engine provided with a cam driving device according to the present invention.
Figure 2:
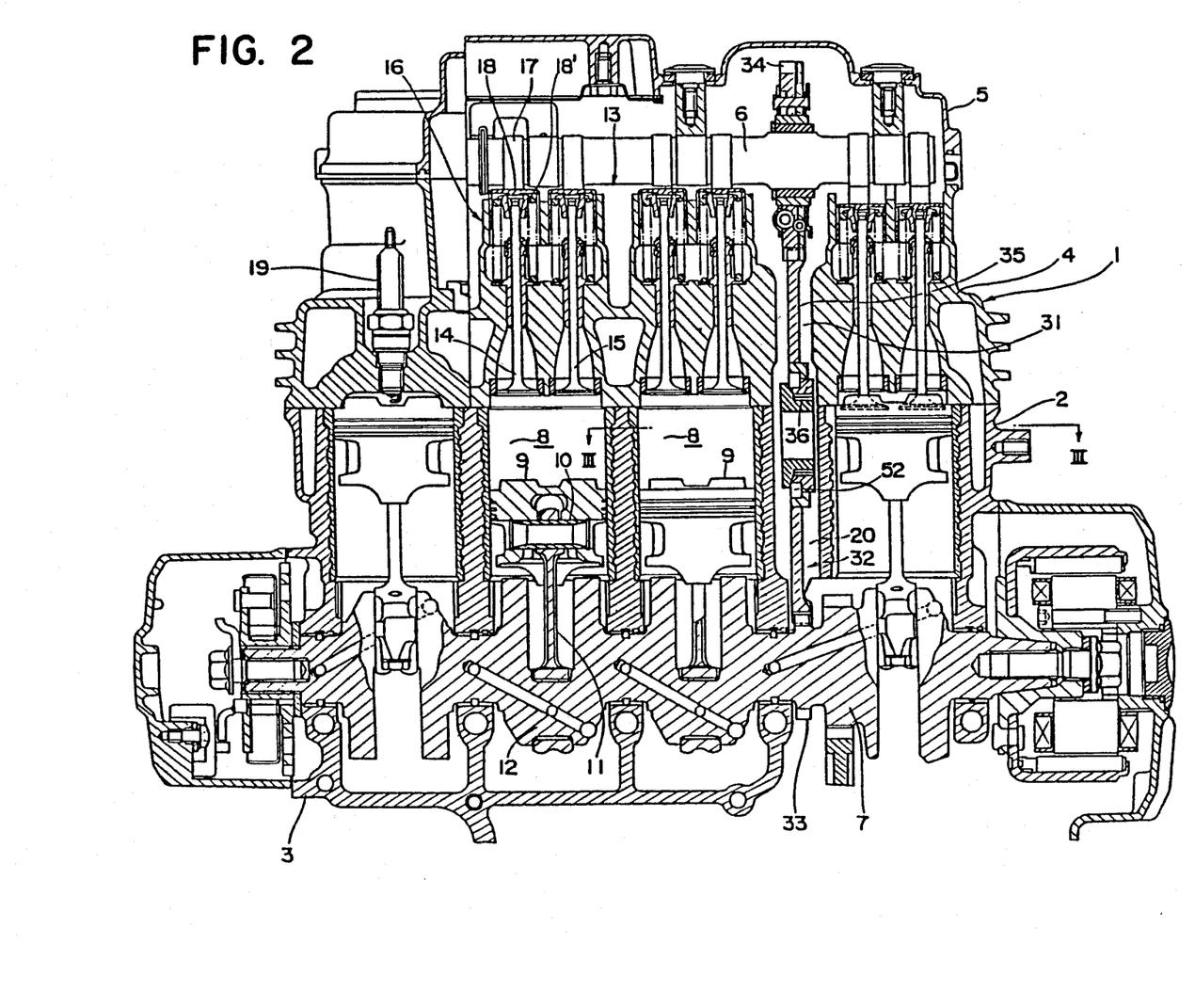
FIG. 2 is a cross-sectional view taken along section line II—II of FIG. 1.

FIG. 1 shows a cross section of an engine provided with a cam shaft driving device according to the present, and FIG. 2 shows a cross section taken along line II—II in FIG. 1.

In these Figures, reference numeral 1 shows, for example, an engine body of a four cylinder, water cooled engine. The engine body 1 consists of a cylinder block 2, a crank case 3 located beneath the cylinder block 2, a cylinder head 4, and a head cover 5. In the engine body 1 there is provided a cam shaft 6 located in the head cover 5 and a crank shaft 7 located in the crank case 3, respectively. In each cylinder 8 of the cylinder block 3 there is slidably inserted a piston 9 to which a connecting rod 11 is connected through the intermediary of a pin 10. Each connecting rod 11 is rotatably connected to a pin portion 12 of the crank shaft 7. In the cylinder head 4 there is provided a valve device 13 for each cylinder 8. These valve devices 13 consist of an intake valve 14, an exhaust valve 15, and a valve action mechanism 16 for opening and closing said intake and exhaust valves 14, 15 in synchronism with an actuating timing of the piston 9. The valve motion mechanism 16 is constituted by a cam 17 provided on the cam shaft 6, a tappet 18, and a valve spring 18' or the like. In the cylinder head 4 there is threadedly screwed an ignition plug 19.

Figures 3, 4:
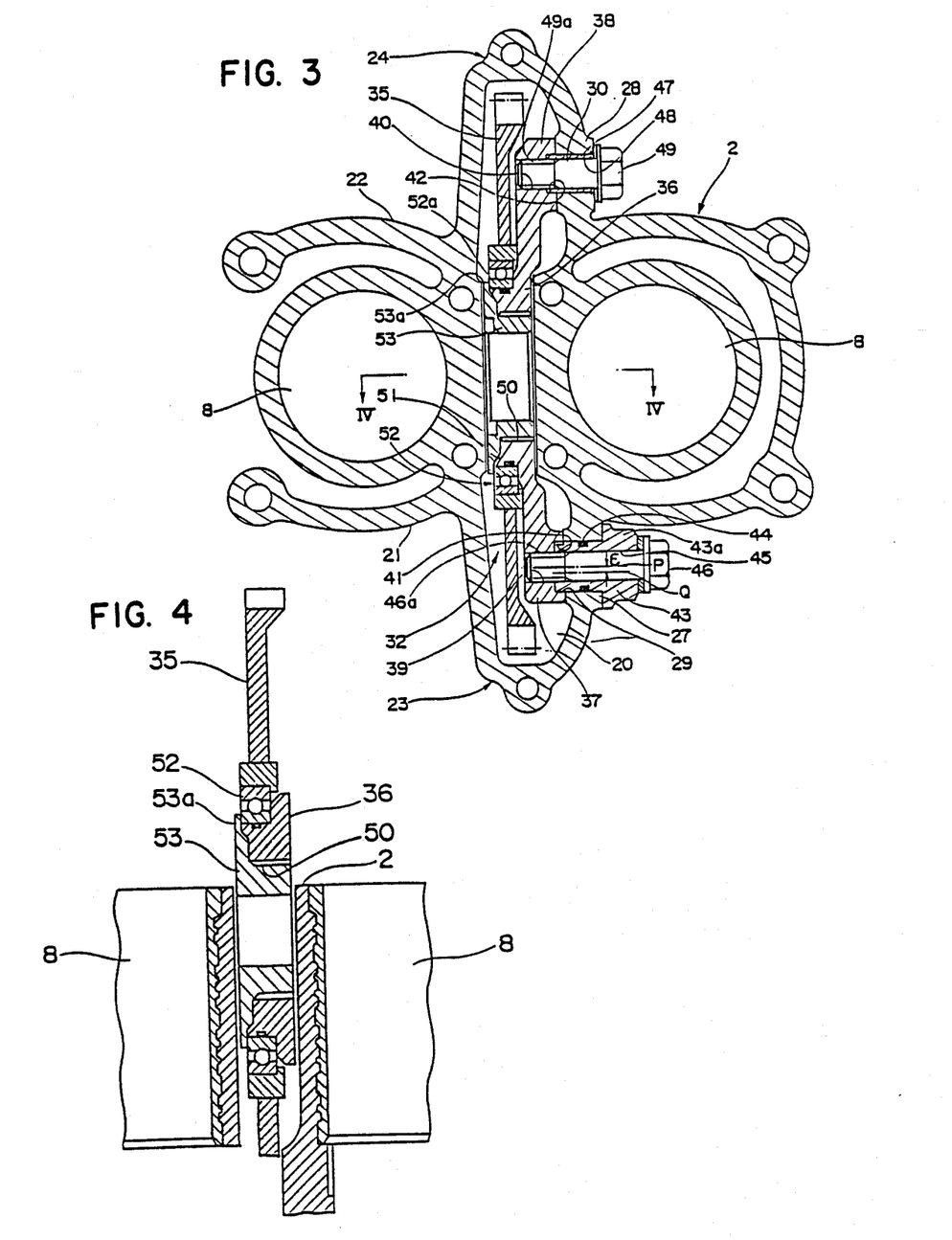
FIG. 3 is a cross-sectional view taken along section line III—III of FIG. 2.
FIG. 4 is a cross-sectional view taken along section line IV—IV of FIG. 3.

In the cylinder block 2 there is formed a space portion 20 which is located between a third cylinder 03 and a fourth cylinder 04 and which is open in upper and lower ends. The space portion 20, as shown in FIG. 3, in inside in left and right directions (a direction intersecting laterally with the longitudinal, cylinder arrangement direction) of the engine body 1 and is narrow in front and rear directions (the cylinder arrangement direction). For this reason, on left and right wall portions 21, 22 are projected wall portions 23, 24 which constitute a receiving space 32 described here-in-after. On rear surface portions of these wall portions 23, 24 are formed seal portions 27, 28. In the left seat portion 27 there is formed a shaft bore 29 and in the right seat portion 28 there is formed a pin bore 30, respectively.

In the cylinder head 4 is formed a space portion 31 disposed above the space portion 20. The receiving space 32 is constituted by these space portions 20, 31.

A cam driving gear 33 on crank shaft 7 is provided which projects into a lower part of the receiving space 32. A cam gear 34 is provided on the cam shaft 6 and projects into an upper portion of the receiving space 32, above the gear 33.

In the receiving space 32 there is accommodated a cam idling gear 35 which associates or interconnects the cam driving gear 33 with the cam gear 34. A gear holder 36 in space 32 rotatably holds or mounts the cam idling gear 35. On opposite side portions of holder 36 there are provided mounting portions 37, 38 in which threaded bores 39 and 40 are provided. On the rear surface portion of the left (viewed from engine front) sidemounting portion 37 there is formed a shaft bore 41 which is eccentric in relation to the center "P" of the threaded bore 39. On the rear surface portion of the right side mounting portion 38 there is provided a pin bore 42 which is concentric with the threaded bore 40.

Gear holder 36 can be substantially plate-like in cross section.

Into the shaft bore 29 of the seat portion 27 of the wall portion 23 in the cylinder block 2 there is rotatably inserted a hollow eccentric shaft 43 through the intermediary of an "O"-ring 44. An end of the eccentric shaft 43 is rotatably inserted into the eccentric shaft bore 41 of the left side mounting portion 39 of the gear holder 36. On the eccentric shaft 43 is formed a square head shaft portion 43-a with which a rotary tool (spanner or the like) is disengageably engageable. Into an inner bore portion 45 of the eccentric shaft 43 is inserted a bolt 46. A threaded portion 46-a of this bolt is screwed into the threaded bore 39 of the left side mounting portion 37 on the gear holder 36.

Into the pin bore 30 of the seat portion 28 of the wall portion 24 in the cylinder block 2 there is inserted a tubular pin 47, one end of which is inserted into the pin bore 42 of the right side mounting portion 38 of the gear holder 36.

Into an inner bore portion 48 of the cylindrical pin 47 is inserted a bolt 49, a threaded portion of which is screwed into the threaded bore 40 of the right side mounting portion 38 of the gear holder 36.

In a center portion of the gear holder 36 there is formed a threaded bore 50. A bearing shaft portion 51 is formed in this center portion so to surround the threaded bore 50. A bearing is fitted into the bearing shaft portion 51. Into the threaded bore 50 is screwed a bearing securing member 53, an outer peripheral end 53a of which presses against an inner body portion 52a of the bearing 52.

The bearing 52 carries the cam idling gear 35 which meshes with the cam drive gear 33 and the cam gear 34.

Upon operation of the engine, rotation of the crank shaft 7 is transmitted to the cam shaft 6 via the cam driving gear 33, the cam idling gear 35 and the cam gear 34. The cam shaft 6 is rotated and driven through this drive train.

By engaging a rotary tool with the square head shaft portion 43a of the eccentric shaft 43 and rotating the rotary tool, the eccentric shaft 43 may be rotated and adjusted. In this manner, the gear holder 36 is adapted to swing about the pin 47, whereby the swinging adjustment is made with respect to the distance between the bearing shaft portion 51 of the gear holder 36 and the crank shaft 7. Also, this adjustment affects the meshing condition between the cam idling gear and the cam drive gear 33 so as to give an appropriate backlash control between the gears 35 and 33 so as to reduce gear meshing sounds.

As mentioned above, the cam shaft driving device for an engine according to the present invention is characterized in that first and second wall portions are projected outwardly from both sides of an engine body so as to constitute a receiving space. This space is provided between adjacent cylinders in the engine body and is laterally larger than a diameter of the cylinders. The cam idling gear is rotatably supported and received on one side surface of a single gear holder in the receiving space, with the gear holder being mounted on one of the wall portions on one side of the space.

Accordingly, since the cam idling gear is adapted to be supported in a cantilever-like structure by only one gear holder in the receiving space portion formed between two adjacent cylinders, the width of the receiving space can be decreased in the direction of the cylinder arrangement of the engine body. Also, since the cylinder arrangement pitch becomes small, the overall engine is intended to become more compact in the cylinder arrangement direction. Further, since the gear holder may be sole in nature, the number of parts can be reduced as compared with the prior device.

Furthermore, since the gear holder supporting the cam idling gear in the cantilever structure is mounted on one of the wall portions which project outwardly from both sides of the engine body, the idling gear and the gear holder can be easily assembled on the engine body.

DETAILED DESCRIPTION OF SHOCK ABSORBING EMBODIMENT

The aspect of the invention to be considered relates to a supporting structure for the idler gear which is interposed between a driving gear and a driven gear. More particularly, this concept pertains to a supporting structure for the idler gear which is adapted to be capable of adjusting backlash which may be generated between an idler gear and a gear meshing with the idler gear.

Prior Art

In the prior art, there is known, for example; as shown in Japanese utility model application publication No. 60-2056 (No. 2056/1985), a supporting structure for an idler gear.

In this publication there is shown a supporting structure for an idler gear in a four cycle internal combustion engine which is adapted to be attached between a crank shaft gear and a cam gear and to transmit an output from the crank shaft to the cam shaft.

With this structure, there is provided with an idler gear which is supported so as to be capable of swinging in a direction substantially perpendicular to a rotary axis of the cam shaft. This idler gear meshes with the cam gear provided on the cam shaft. An arm member pivotably mounts the idler gear at a desired position between its swinging center and its swinging end. The swinging center of the arm member is fixed to a cylinder side wall. Adjusting and fixing means serve to adjust a swinging angle of the arm member and fix the arm member at a desired swinging angle position.

With this arrangement, it is hoped that the backlash between the crank gear and the idler gear, may be solved by swinging the arm member to adjust the distance between the idler gear and the crank gear and by fixing the distance at an appropriate position.

In this connection, it is to be recognized that each of gears may not be in a perfectly uniform condition with respect to dimensions of thickness of teeth and grooves of the teeth, etc.

Problem Solved by the Aspect of Invention

Because of working accuracy, there are slight differences in the dimensions, etc. of cam drive chain elements. For this reason, in the structure mentioned above, even if the arm member is displaced and the idler gear is arranged at an appropriate position, a backlash may be slightly generated depending to the gear meshing position. Also, even if the backlash is sometimes only slightly generated, when the separation distances become large by thermal expansion of parts occurring from change of temperature during driving, the backlash problem can not be solved with this prior art structure. In order to deal with it, it was necessary to readjust the arm member as conditions changed.

Thus, in the prior art mentioned above, there is a problem in that it can consistently, without readjustment, deal with backlash occurring from the unevenness of teeth dimensions and thermal expansion.

Solutions of Present Invention

In order to solve the above mentioned problem, the present invention provides, in a supporting structure for idler gear, a holder which supports the idler gear so as to be capable of swinging movement transversely of the axis of crank shaft rotation. This structure includes a bearing which is capable of rotating on a supporting boss formed between a swinging center point and a swinging end. Adjusting and fixing means serve to adjust this swinging angle of said holder and fix the latter at a desired position of angle. This invention aspect is characterized in that a shock absorber housing space is provided between the boss of said holder and the bearing, and in that a shock absorbing member is interposed in this space.

According to the present invention, by swinging the holder onto which the idler gear is fitted, it is possible to adjust the distance between the shafts of the idler gear and the gears meshing with the idler gear. If the holder should be fixed by the adjusting and fixing means at an angle in which the idler gear becomes to a condition resiliently pressed to the gear by the resiliency of the shock absorbing member, even if a slight change is generated in the backlash, the idler gear resiliently responds to this change and swings slightly due to the resiliency of the shock absorbing member, whereby the backlash is substantially solved entirely.

The present invention will now be described with respect to an embodiment applied to an idler gear for transmitting an output of a crank shaft to a cam shaft in a four cycle, internal combustion engine carried on a motorcycle. This discussion will ensue with reference to FIGS. 6 to 14.

Figure 6:
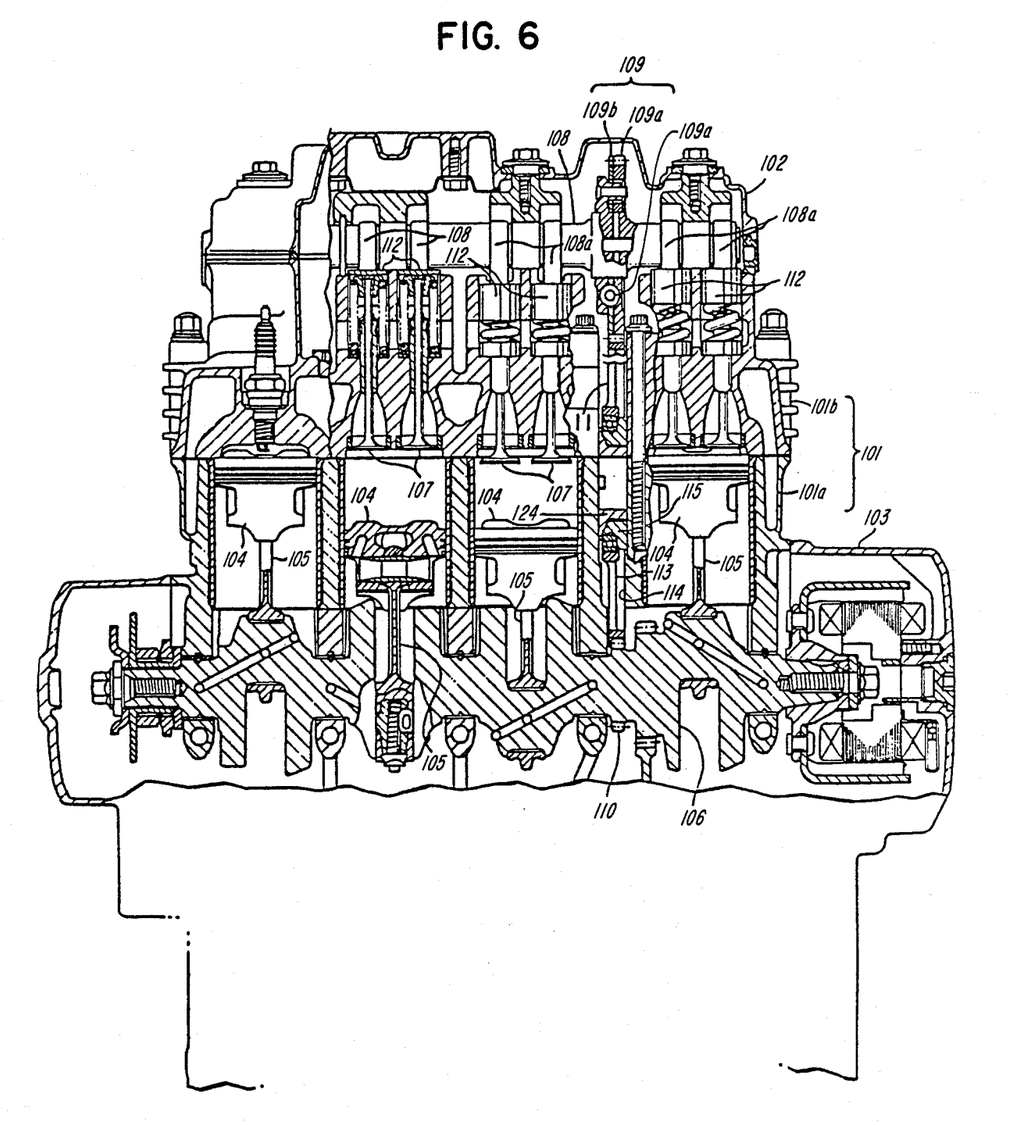
FIG. 6 is a longitudinal cross-sectional view showing an internal combustion engine applying another embodiment of this invention.

FIG. 6 shows a cross sectional view of this internal combustion engine. This internal combustion engine is a so called four valve-DOHC type in which valves of intake and exhaust sides are provided and two cam shafts are provided independently to actuate the valves of respective sides.

In FIG. 6, reference numeral 101 shows a cylinder consisting of a cylinder block 101a integral with a crank case and a cylinder head 101b. Reference numeral 102 shows a cylinder head cover covering an upper surface of the cylinder head 101b, with reference numeral 3 showing a side cover. Inside the cylinder block 101a there are provided a plurality of pistons (four in this case) in a row. These pistons are connected respectively to a crank shaft 106 provided inside the crank case 103 through the intermediary of a connecting rod 105. The cylinder block 101a, integral with the crank case, and the cylinder head 101b are made from aluminium castings.

Figure 7:
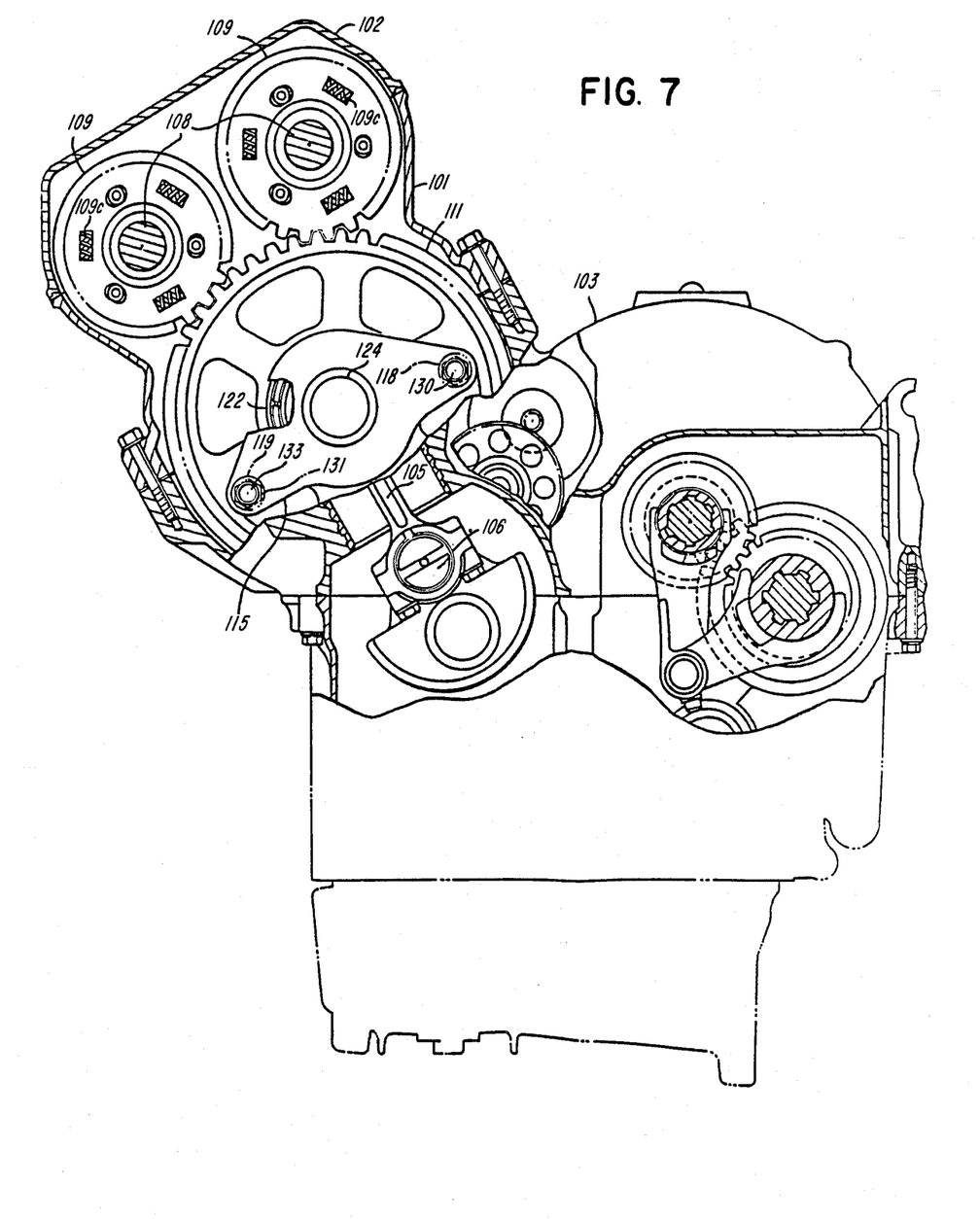
FIG. 7 is a transverse, cross-sectional view of the FIG. 6 embodiment.

As shown in FIG. 7, inside the cylinder head cover 102 are provided two cam shafts 108 for the exhaust side and for the intake side (showing only the intake side in FIG. 6). These cam shafts actuate exhaust valves (not shown) and intake valves (shown at reference numeral 107 in FIG. 6), and extend parallel to the crank shaft 106. On these cam shafts 108 there are provided a pair of cams 108a for one piston 104 and there is mounted a cam gear 109. The cam shaft 108 is rotated by the rotation of the crank shaft 106 through the intermediary influence of a crank gear 110, an idler gear 111, and each of the cam gears 109.

Due to the rotation of the cam shaft 108, the cam 108a is adapted to actuate the valves (the intake valves 107 and the exhaust valves not shown) provided inside the cylinder head 101b through the intermediary of a tappet 112.

Figure 8:
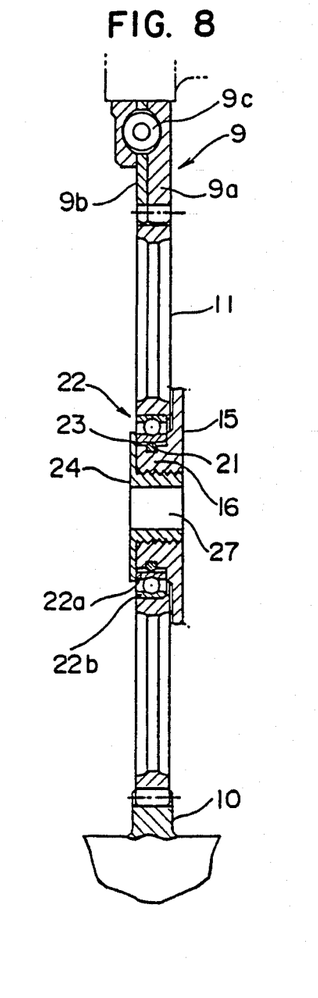
FIG. 8 is a longitudinal, cross-sectional view show in an idler gear and a gear meshing with the idler gear as incorporated in the FIG. 6 embodiment.

As shown in FIGS. 6 to 8, the cam gear 109 is constituted by a main gear 109a and a sub gear 109b. These are formed to have the same diameter and pitch. The sub gear 109b is rotatably fitted to the main gears 109a, but the teeth of the sub gear 109b are energized into a condition slightly displaced in a peripheral direction relating to the teeth of the main gear 109a. This is accomplished by a coil spring 9c interposed over the sub gear 109b and the main gear 109a, where-by the backlash between the cam gear 109 and the idler gear 111 is designed to become zero.

The teeth of the idler gear 111 are thus meshed with both teeth of the main gear 109a and the sub gear 109b resiliently, and the idler gear 111 is adapted to receive a resilient force in an energizing direction of the sub gear 109b.

Figure 10:
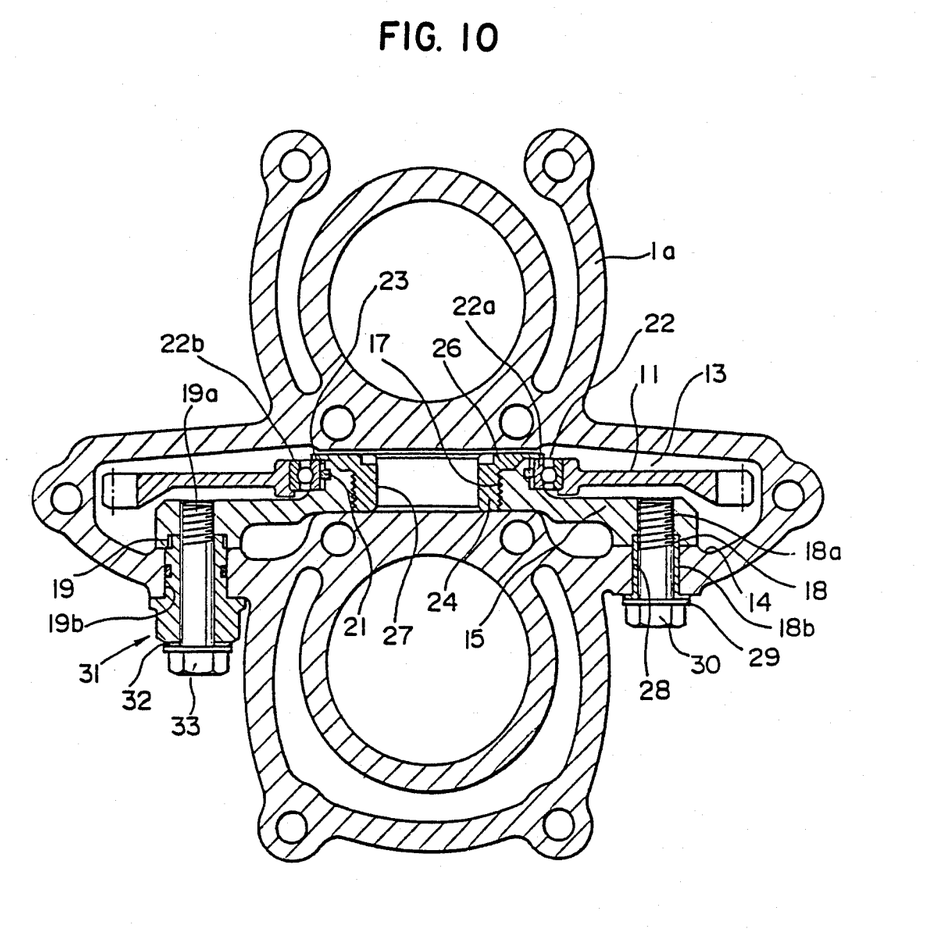
FIG. 10 is a partial plan and cross-sectional view of the internal combustion engine of FIG. 6.

The idler gear 111, as shown in FIGS. 6 and 10, is arranged in cylinder assembly 101, in a space 113 provided between the first and the second pistons 104 from the right side of FIG. 6. Gear 111 is supported on an inner wall 114 of the cylinder of the first piston 104 side.

The following description will be made about the supporting structure of this idler gear 111.

Figure 9:
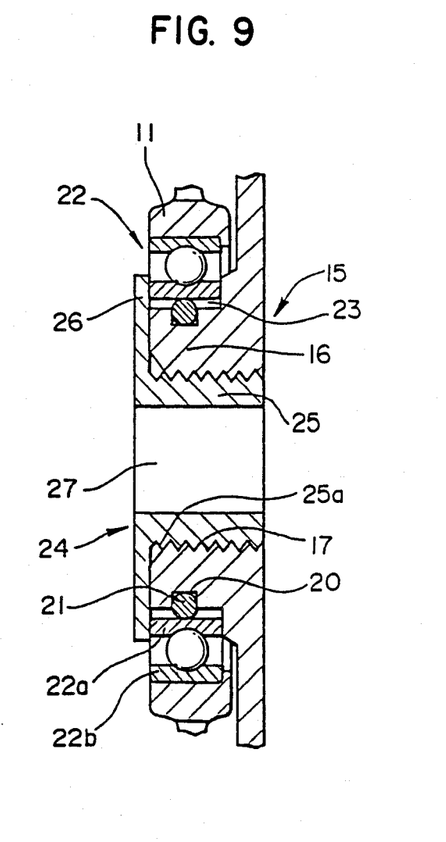
FIG. 9 is a fragmentary, longitudinal, cross-sectional view showing major parts of the FIG. 8 assembly.
Figures 11, 12, 13:
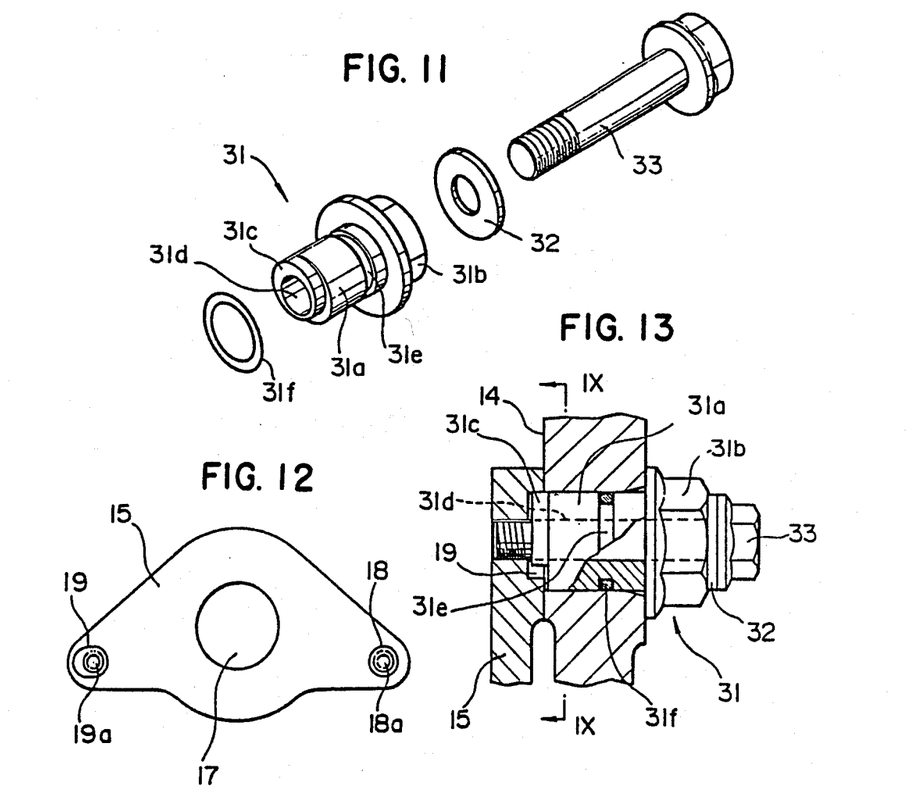
FIG. 11 is a perspective view showing adjusting and fixing means of the FIG. 10 assembly.
FIG. 12 is a side view showing a holder of the FIG. 10 assembly.
FIG. 13 is a fragmentary, enlarged, cross-sectional view showing the adjusting and fixing means of FIG. 10.
Figure 14:
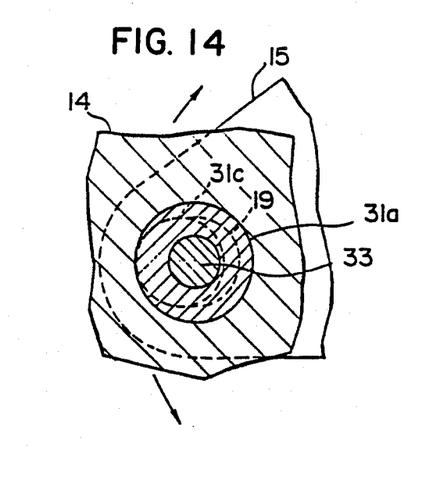
FIG. 14 is a cross-sectional view taken along line IX—IX of FIG. 13.

The idler gear holder 115 is an arm member, possibly made from iron, as shown in FIGS. 7 and 12. A boss 116 is formed in a center portion of one side surface of the holder 115, as shown in FIG. 9. The boss 116 has a screw threads 117 in the center portion thereof. In this screw threads 117 there is connected a cap 124 by means of screw threads.

As shown in FIG. 12, at both ends of the holder 115, recesses 118, 119, having the same depth, are formed in a side surface opposite to the side surface from which the both 116 projects. One recess 118 (right side of FIG. 12) of these recesses 118, 119 is circular and a threaded bore 118a is opened in the center thereof. The other recess 19 is oblong along a longitudinal direction of the holder 115, the oblong recess 119 has a threaded bore 119a opening thereto. This bore 119a is positioned at an eccentric position, deviated or displaced from the center of the oblong recess 119 and extends to the inner side of the holder 115.

Further, as is shown in FIG. 9, a peripheral groove 120 is formed along a peripheral direction on the outer peripheral surface of the boss 116 of the holder 115. In the peripheral groove 120 is inserted an "O"-ring (shock absorbing member) 121 having a required resiliency. As shown, "O"-ring 121 projects out of the mounting recess 120. Onto the boss 116 there is fitted a ball bearing 122 through the intermediary of the "O"-ring 121. An inner race side 122a of the ball bearing 122 is rotatably stationary relative to the boss 116 and an outer race is rotatable.

The inner diameter of the inner race 122a of the ball bearing 122 is somewhat larger than the outer diameter of the boss 116. A resulting clearance between the peripheral groove 120 and the inner race 122a of the ball bearing 122 is smaller than the diameter of the "O"-ring 121 which is thus inserted with some interference. By this arrangement, the ball bearing 122 is concentric with the boss 116 but between the inner peripheral surface of the inner race 122a and the outer peripheral surface of the boss 116 is left a slight gap 123.

On the outer race 122b of the ball bearing 122 is fitted and fixed the idler gear 111 so as to rotate integrally with the outer race 122b.

Also, as is shown in FIG. 9, the cap 124 has a flange 126 which is formed on one end of an axial direction of a boss 125 and which is substantially the same diameter as the inner race 122a of the ball bearing 122. Screw threads 125a formed on the outer peripheral surface of the boss 125 are screwed into the screw threads 117 of the holder 115, and a bore 127 is opened in the center of axis. When the boss 125 is screwed into the screw threads 117 from the side of the holder 115 from which the boss 116 projects, an edge of the flange 126 covers the side surface of the inner race 122a of the ball bearing 122.

Thus, the idler gear 111 is rotatably mounted on the holder 115 through the intermediary of the ball bearing 122 and the shock absorber 121.

The holder 115 is mounted at a required position on the inner wall 114 of the cylinder so that the end of the oblong recess 119 side is adapted to slightly swing about the circular recess 18 and is fixed at a desired swinging angle.

That is, as shown in FIG. 10 at the left and right required position of the inner wall 114 of the cylinder 114, are opened bores 118b, 119b. These bores serve to mount the holder and penetrate to outside the internal combustion engine corresponding to the locations of the threaded bores 118a, 119a located at both ends of the holder 115.

The right side bore 118b is aligned with the threaded bore 118a of the circular recess 118 side of the holder 115. A pin 128 is inserted into the threaded bore 118a, and the bore 118b and the circular recess 118. A bolt 130 is screwed into the threaded bore 118a from the outside of the internal combustion engine through the intermediary of a washer. The holder 115 now exists in a condition which is adapted to be rockably or swingably supported about the bolt 130 so as to permit swinging in a direction extending transversely of the axis of rotation of the cam shaft 108.

The left side of bore 119b, as shown in FIG. 10, is aligned with the threaded bore 119a of the oblong recess 119 side of the holder 115. A bolt 133 is screwed into the threaded bore 119a from the outside of the engine and passes through an intermediary pin 131 and a washer 132.

Pin 131 is inserted into the left side bore 119b and has a function which actuates the swinging movement of the holder 115. This swinging adjusting and fixing means for holder 115 is constituted by the pin 131 and the bolt 131.

As shown in FIG. 11, the pin 131 has a bolt head portion 131b with a flange at one end of a cylindrical, large diameter portion 131a. At the outer end of the pin 131 is formed a small diameter, cam portion 131c which is eccentric from the center of axis of the large diameter portion 131a. Further the pin 131 has a bolt receiving bore 131d which coincides with the center of the axis of the large diameter portion 131a and which penetrates through the pin to permit the insertion of the bolt 133.

As shown in FIGS. 7 and 13, the pin 131 is fitted so that the cam portion 131c contacts with the outside end surface of the oblong recess 119 of the holder 115 at a peripheral surface corresponding substantially to the large diameter portion 131a.

This pin 131 may be rotated by loosening the tightening bolt 133. As showing in FIG. 14, when the pin 131 is rotated in a clockwise direction, the peripheral surface of the cam portion 131c abuts an upper portion of the inner peripheral wall of the oblong recess 119 of the holder 115 so as to lift the holder 115. Conversely, when the pin 131 is rotated in a counter clockwise direction, the large diametered peripheral surface of the cam portion 131c engages a lower portion of the inner peripheral wall of the oblong recess 119 so as to lower the holder 115.

Thus, by rotating the pin 131, the holder 115 may be swung about the bolt 130, whereby the idler gear 111 is swung in accordance with the swinging of the holder 115.

In the large diameter portion 131a of the pin 131 there is formed a peripheral groove 131e in which an "O"-ring 131f inserted so as to seal the inside of the internal combustion engine.

According to the supporting structure for the idler gear 111 as mentioned above, it is possible to substantially entirely solve or cure a backlash problem generated between the idler gear 111 and the cam gear 109. The following description is made about its function.

When the bolt 133 screwed into the swinging end side of the holder 115 is loosened, the holder 115 is capable of swinging around the bolt 130 of the stationary end side. Now, assume that the pin 131 is intended to rotate for a required angle in the clockwise direction in FIG. 14. Then, the idler gear 111 slightly lowers substantially linearly while undergoing a large circular arc movement around the bolt 130. In this time, through the resilient force of the "O"-ring 121 attached to the boss 116 of the holder 115, the mechanism is properly adjusted so that the idler gear 111 becomes into a condition slightly resiliently pressed to the crank gear 110.

In that case, even if the backlash occurring between both gears 110, 111 is larger than the backlash of the other portion due to the slight difference in the dimensions of thickness and groove of teeth, the idler gear 111 slightly falls as permitted by the resiliency of the "O"-ring 121, whereby the backlash is solved.

In contrast with this, if the meshing between the teeth becomes slightly tight and their interference occurs, the idler gear 111 receives a force to be returned upwardly from the crank gear 110. Then, the idler gear 111 displaces slightly upward by the resiliency of the "O"-ring 121, whereby an appropriate meshing condition is kept.

When each of parts expands with thermal effect during driving of the internal combustion engine and the distance between the shafts of both gears 110, 111 is changed, the idler gear 111 swings for its changed distance as permitted by the resiliency of the "O"-ring 121 and produces a condition having not nearly the backlash of the prior art.

That is, after an initial setting in which the holder 115 is swung and the distance between the shafts if the idler gear 111 and the crank gear 110 is fixed at an appropriate position, a backlash resulting from a slight difference in the dimensions of thickness and space of the teeth or from the thermal expansion is absorbed due to the fact that the idler gear 111 slightly swings in accordance with the condition of its backlash as permitted by the resilience of the "O"-ring 121.

As mentioned above, while the idler gear 111 rotates the backlash relative to the crank gear 110 is minimized, the striking sound between the gear teeth becomes lost or reduced and the mechanical noise otherwise generated during driving is widely reduced. Also, as was described previously, due to the sub gear 109b of the cam gear 109, the idler gear 111 receives the force in the energizing direction of the sub gear 109b of the cam gear 109, whereby the backlash between the idler gear 111 and the cam gear 109 is designed to become zero.

Because the idler gear 111 is rockable, if the crank gear 110 and the cylinder 101 have errors in their dimension accuracy, it is possible to set the appropriate position at which the idler gear 111 is arranged, by rotating the pin 131 on assembling the elements of the gear train.

Since the actuation of rotation of the pin 131 can be effected from the outside of the internal combustion engine, it is possible to properly adjust the distance between the shafts of the crank gear 110 and the idler gear 111 while observing the operating condition of the internal combustion engine.

As mentioned above, the supporting structure for idler gear according to the present invention is characterized in that the idler gear holder swings in a direction extending transversely of the axis of rotation of the gear meshing with the idler gear, that a gap is provided between the boss of the holder and the idler gear bearing, and that a shock absorbing member is interposed peripherally and radially of the boss. Accordingly, if the holder is swing, the distance between the shafts of the idler gear and the gear mashing with the idler gear can be adjusted. Also, if the holder is fixed by the adjusting and fixing means at such an angle that the idler gear becomes into the condition pressed resiliently to the gear due to the resiliency of the shock absorbing member, even if a slight change occurs in the backlash condition, the idler gear slightly swings due to the resiliency of the shock absorbing member whereby the backlash is solved substantially entirely.

Therefore, the noise due to the backlash is widely reduced and the rotating actuation is smoothly performed.

SCOPE OF INVENTION

Those familiar with this invention disclosure and skilled in the engine art may well recognize additions, deletions, substitutions, modifications, alternatives, and/or equivalent arrangements which would be within the purview of the invention as set forth in the appended claims.

What is claimed is:

1. A cam shaft driving device for an engine which is adapted to operably associate a cam gear located on a cam shaft of an upper portion of an engine body with a driving gear on a crank shaft of a lower portion of the engine body, with this association being effected through the intermediary of a cam idling gear, said device comprising:
   first and second wall portions mutually displaced along the axis of crankshaft rotation of said engine and projecting outwardly and laterally from both sides of said engine body to provide a receiving space;
   said receiving space
      being provided between adjacent cylinders in said engine body and
      being larger in laterally extending width than a diameter of said cylinders, with said width extending laterally of said cylinders and transversely of said axis of rotation of said crank shaft;
   a single plate-like gear holder located in said receiving space,
      said gear holder being formed as a single plate-like member which is mounted on at least one of said wall portions; and
   said cam idling gear being rotatably supported and received on a surface of said single gear holder.

2. A cam shaft driving device for an engine which is adapted to operably associate a cam gear located on a cam shaft of an upper portion of an engine body with a driving gear on a crank shaft of a lower portion of the engine body, with this association being effected through the intermediary of a cam idling gear, said device comprising:
   first and second wall portions mutually displaced along the axis of crankshaft rotation of said engine and projecting outwardly and laterally from both sides of said engine body to provide a receiving space;
   said receiving space
      being provided between adjacent cylinders in said engine body and
      being larger in laterally extending width than a diameter of said cylinders, with said width extending laterally of said cylinders and transversely of said axis of rotation of said crank shaft;
   supporting means for said cam idling gear including
      a support operable to support said idling gear for swinging movement in a plane extending transversely of the axis of rotation of said driving gear meshing with said idling gear;
   said supporting means including boss means defining, at least in part, a single gear holder located in said receiving space and mounted adjacent to at least one of said wall portions;
   said supporting means also including a bearing rotatably supporting said idling gear on said boss means;
   said boss means being supported for swinging movement between a swinging center axis and a swinging end of said supporting means,
      said center axis extending longitudinally of the axis of rotation of said crank shaft;
   adjusting and fixing means operable to adjust a swinging angle of said boss means and secure the latter at a desired position;
   a shock absorber housing space being provided between said boss means and said bearing; and
   a shock absorbing member interposed in said shock absorbing housing space radially between said boss means and said bearing.

3. A device as described in claim 2 wherein:
said shock absorbing member comprising an annular resilient member radially interposed in shock-absorbing relation, between said bearing and said boss means.

* * * * *